Aug. 2, 1938.   W. K. ROSE   2,125,738
AIRFOIL
Filed Dec. 17, 1936   2 Sheets-Sheet 2
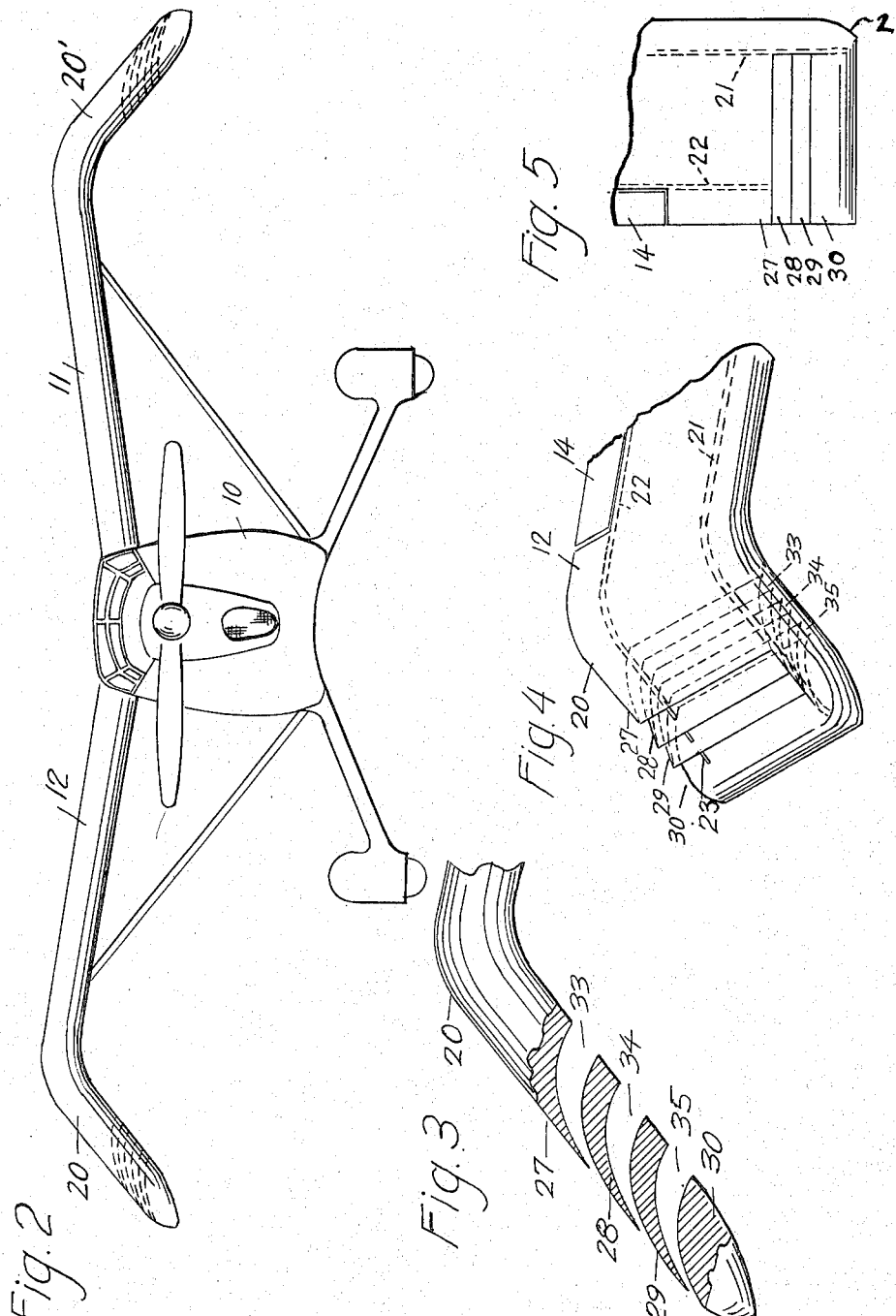
INVENTOR.
William K. Rose
BY
ATTORNEYS.

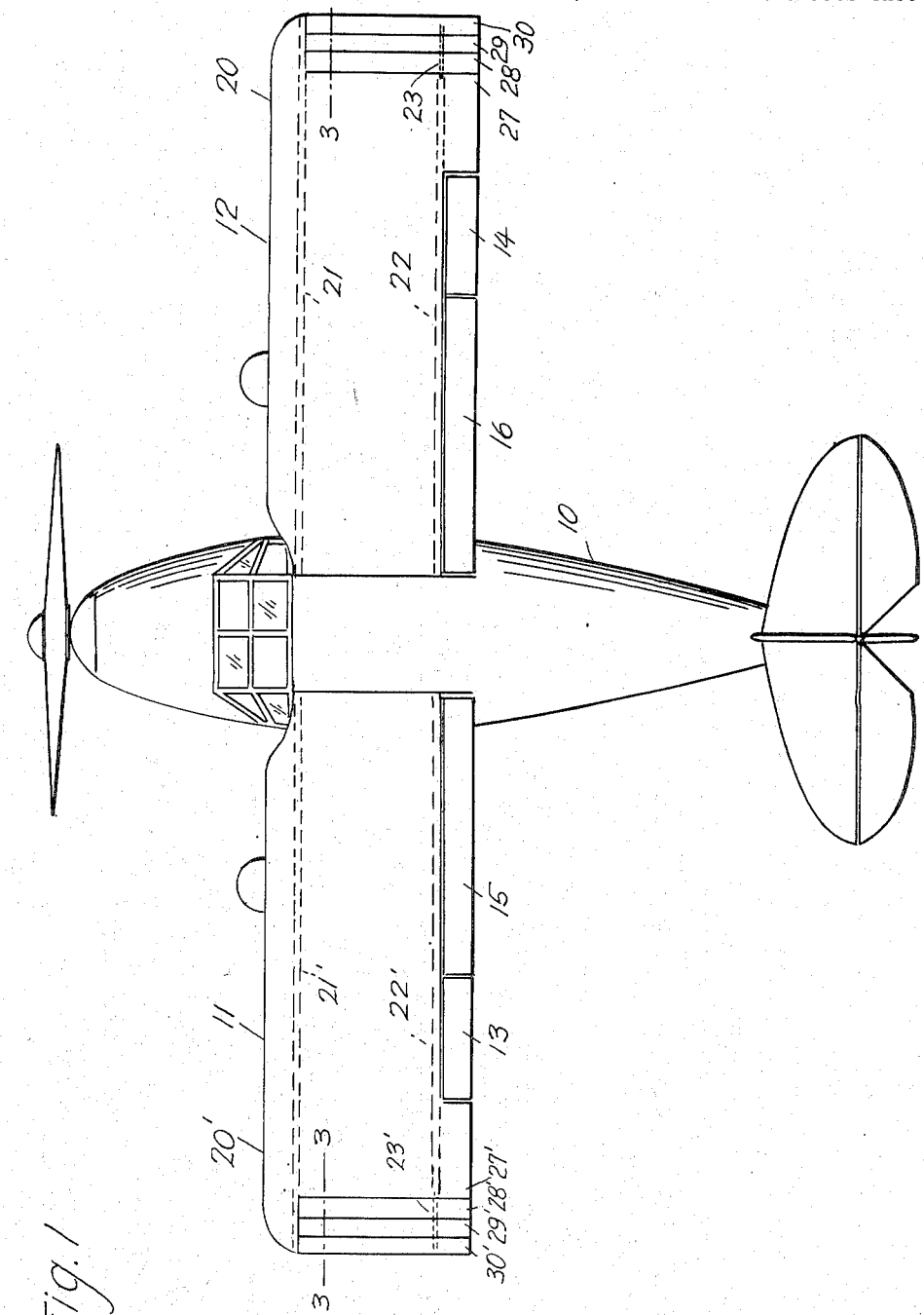

Patented Aug. 2, 1938

2,125,738

UNITED STATES PATENT OFFICE 2,125,738

AIRFOIL

William K. Rose, New York, N. Y.

Application December 17, 1936, Serial No. 116,246

5 Claims. (Cl. 244—40)

This invention relates to airplanes and more particularly to airfoils used in the construction thereof.

With airfoils of solid type such as are commonly employed in present-day construction the air beneath the airfoils in flight at the wing tips and for a certain distance inwardly therefrom takes a path more or less spanwise and curls over the wing tips forming vortices which produce a drag. Furthermore, much of the sustaining force of the air beneath the wing is lost by the air traveling in this path which may be deemed leakage, so that the lift of the airfoil is greatly diminished.

One of the objects of this invention is to eliminate or largely diminish the drag thus produced. A further object of the invention is to utilize the air currents traveling in a general spanwise direction at the ends of the wings beneath to increase rather than to decrease the lift of the airfoil.

In accomplishing these objects I preferably employ passageways in the outer ends of the airfoils of the character generally described and broadly claimed in my U. S. Letters Patent No. 2,077,070, granted April 13, 1937, on my copending application Ser. No. 110,145, filed November 10, 1936. In said Letters Patent I have illustrated said passageways as extending in a general spanwise direction through the airfoils. In the present invention, however, the said passageways extend in a general chordwise direction and are located preferably at the ends of the airfoils. The main supporting surface of the airfoils may or may not be provided with the spanwise passageways above defined, but for simplicity of showing I herein illustrate the main supporting surface as of solid wing type now commonly employed in practice.

A further object of this invention is by taking advantage of the structure hereinabove outlined to permit the use of smaller airfoils than would otherwise be required to carry a specific load at a specific speed, or conversely with the size of airfoils now commonly employed in practice to carry larger loads at the same speed than is at present permissible.

A further object of this invention is by taking advantage of the structure hereinabove outlined to permit of slower flying, take-off and landing speeds and of steeper angles of ascent and descent than are at present permissible with the commonly employed type of solid wing.

Further objects of this invention will be apparent as this specification proceeds.

I have chosen as a means for illustrating my invention a high wing monoplane with its airfoils set at a positive dihedral angle, said airplane being equipped with the usual landing gear for take-off and landing on the ground. It should be understood, however, that this is purely for convenience of illustration and is not to be considered in any sense as limitative on the scope of this invention. The drawings are in large part schematic. In these drawings,—

Figure 1 is a plan of the airplane selected for illustration with the airfoils embodying one form of this invention;

Fig. 2 is a front elevation of the airplane illustrated in Fig. 1;

Fig. 3 is a sectional view of the airfoil of Fig. 1 on the line 3—3 thereof drawn on a larger scale;

Fig. 4 is a detailed perspective of the portion of the airfoil shown in Fig. 3; and Fig. 5 is an end view of the airfoil of Fig. 1, broken away.

The fuselage 10 of the airplane illustrated has mounted thereon at the top in usual well-known manner an airfoil 11 at the left side and an airfoil 12 at the right side, the said airfoils being set at a positive dihedral angle. These airfoils are provided respectively with conventional ailerons 13 and 14, which ailerons are supplied with means for operation (not shown) by the pilot in ordinary manner as is well known. The airfoils 11 and 12 are also respectively provided with conventional flaps 15 and 16, which flaps are supplied with means for operation (not shown) by the pilot in ordinary manner as is well known.

When the positive dihedral mounting of the wings is employed I prefer that the extremities of the airfoils provided with the passageways as above indicated be downwardly extended at an angle from the main supporting surface of the wing and have so illustrated. It should be distinctly understood, however, that the invention is not limited to downwardly inclined end portions of the wing, or to their employment with airfoils mounted at a positive dihedral angle.

Aside from the reversal of the wing parts necessitated by the fact that one wing is to the left and the other to the right of the fuselage, the wings are of identical construction and the description of that construction, therefore, can be limited to one wing, the right wing 12 as viewed in Fig. 1 being selected for this purpose.

The outer extremity twenty of the right airfoil 12, which for convenience of nomenclature I will call an elongated wing tip, extends downwardly at an angle of about 45° from the plane of the main supporting surface of the airfoil forming an angle of approximately 135° with said surface and structurally is an extension of the airfoil itself. The forward lateral spar 21 of the airfoil extends to the extremity of the tip. The rear lateral spar 22 terminates part way of the elongated wing tip and is provided with a rigid extension 23 of suitable form terminating at the end of the elongated wing tip.

Four curved vanes or blades 27, 28, 29 and 30 are illustrated forming three passageways 33, 34 and 35. These vanes or blades are substantially of uniform size, shape and cross section.

The first of these vanes or blades 27 is mounted on the forward lateral spar 21 and on the end of the rear lateral spar 22 and marks the termination of the wing form. The chordwise cross section of the wing illustrated tapers from the maximum camber to the trailing edge and while this taper may if desired be followed in the elongated wing tips and in some types may be found to be preferable, in the form illustrated the passageways are of uniform depth and the taper is eliminated by means of the vanes or blades employed. The second, third and fourth of the blades or vanes 28, 29 and 30 are mounted on the forward lateral spar 21 and the extension 23 of the rear lateral spar which is formed to comprise not only a supporting means but rigid spacers between the rear ends of the vanes or blades. Obviously these details of construction as to the mounting of the vanes or blades are not essential to this invention and numerous other forms will suggest themselves to those skilled in the art.

It will be noted that the top vane or blade 27 is mounted at a short distance below the main supporting surface of the airfoil, so that the upper portion of the downwardly inclined elongated wing tip presents a solid wall in opposition to the lateral or spanwise currents of air immediately beneath the lower surface of the main portion of the airfoil. This tends to equalize the air pressure laterally of that surface and to increase the lift of the airfoil and the lateral stability of the airplane.

The parts of the elongated wing tip comprising a part of the left airfoil corresponding with those just above enumerated and described I have marked for convenience respectively 20', 21', 22', 23', 27', 28', 29', 30', 33', 34' and 35'.

Reference being had to Figs. 2, 3 and 4 the general proportions of the main supporting surface and downwardly inclined elongated wing tips, give satisfactory results but should not be deemed as limitative. Thus, for example, dependent upon the primary use to which the plane is to be put and the general type and angle of mounting of wing best adapted therefor, the elongated wing tips with their substantially chordwise passageways may in point of fact not be inclined at all to the plane of the main supporting surface of the airfoil, or they may lie at any suitable angle from that plane up to and including an angle of substantially 90° thereto.

Nor should it be understood that the passageways through the elongated wing tips are to be limited to three passageways in each tip, one or more passageways may be employed depending upon the primary use to which the plane is to be put and the general type, size and angle of mounting of wing best adapted therefor.

These passageways as above indicated preferably conform generally with the passageways set forth and claimed in my said U. S. Letters Patent No. 2,077,070. Their cross section diminishes gradually from the inlet to the outlet thereof and the vanes or blades are so mounted and placed and their cooperating curved surfaces so formed that the mean cross-sectional line of the passageways gradually flattens from inlet to outlet with no appreciable straight line passage for air from inlet to outlet. Most efficient results are obtainable if the mean cross-sectional line of curvature of the passageways gradually flattens from bottom to top. The inlet ports of the passageways are obviously at the lower or inner surface of the elongated wing tips and the outlet ports at the upper or outer surface thereof. The inlet ports of the passageways are forward of their respective outlet ports and the curvature of the passageways is upward, in respect to the lower surface of the elongated wing tips.

When pressure air flows through the said passageways it is subjected to a gradual change of momentum and a force is developed within the passageways themselves which influences the lift drag ratio of the airfoil. As the resultant force vector is directed upwardly the lift of the airfoil is increased.

In my said U. S. Letters Patent No. 2,077,070, I have pointed out wherein the force developed in passageways of the character just described is analogous to that developed in turbines. For convenience of nomenclature and to avoid descriptive details in the claims hereof, I will hereinafter refer to the passageways constructed for operation as set forth in the next preceding paragraph as passageways of the turbine type. Such nomenclature, it is to be understood, is not intended to be limited to the precise form of passageways herein shown or to the form chosen for illustration in said U. S. Letters Patent but as definitive of the passageways broadly described in this application and in said U. S. Letters Patent.

Theoretically, the passageways herein provided should be at right angles to the path of the air flowing therethrough, variable within certain limits dependent upon speed, angle of wing mounting, form and camber of the wing, and other factors well known to those skilled in the art. The designer and constructor building an airfoil embodying this invention must take these conditions under consideration in determining the most efficient angle at which to place the passageways. For convenience of illustration, I have shown these passageways as positioned chordwise of the wing and in the appended claims have used the term "substantially chordwise", that term, however, being intended as defining the direction in which the passageways are placed to meet the varying conditions above indicated wherein differing angles from the reference chord line may be indicated for efficient operation, said angles not necessarily being uniform for all the passageways in each elongated wing tip.

The operation of this invention it is believed will be understood from the foregoing without further detailed description. The air in passing through the passageways develops a force internal thereof which greatly increases the lift at both wing tips. Being directed along the upper surface of the wing tips outwardly or downwardly toward the ends of the wing tips, the vortices which tend to form above the upper surface of the wing tips are in a large part prevented, thus substantially decreasing the drag at the end of the wings. This combination of increased lift and decreased drag at the ends of the airfoil not only adds greatly to the lift of the airfoil as a whole but produces a lateral stability of the plane far in excess of that possible with the ordinary solid form of commercial airfoil.

Not only is the lift and lateral stability of the plane greatly increased but by preventing in large part the tip vortices, the critical angle of attack of the plane is greatly increased and within useful angles of attack stalling is prevented. As the elimination in large part of the tip vortices is due to the jets or streams of air leaving the outlet ports of the passageways, it will be apparent that the invention respecting this function and purpose is not dependent upon or limited to passageways conforming to the turbine character hereinabove set forth.

Where the elongated wing tips are extended downwardly at an angle to the plane of the main supporting surface of the airfoil they tend to trap the air flowing laterally thereof as leakage and thus add to the lift of the main supporting surface of the airfoil, and they increase the total lift thereof not only by the trapping action and by the force developed internally of the passageways but also by the stream of air passing through the passageways in a downward direction.

In trapping the air beneath the main supporting surface of the airfoil the downwardly extending elongated wing tips furthermore cooperate with the flaps and/or ailerons when turned down for obtaining increased lift, and thus are of particular advantage when increased lift is most desired.

The downward inclination of the elongated wing tips particularly when provided with passageways of the turbine type tends automatically to right the plane laterally when the plane has tipped sidewise from an even keel in steady flight. The elongated wing tip on the up-turned wing under such circumstances assumes a position approaching or exceeding the horizontal, with the result that less air is trapped beneath the wing, the air pressure on the lower or inner surface of the elongated wing tip is lessened and the force developed within the passageways is diminished. On the contrary, the elongated wing tip on the downwardly turned wing assumes a position approaching or exceeding the vertical, with the result that more air is trapped beneath the wing, the air pressure on the lower or inner surface of the elongated wing tip is increased and the force developed within the passageways is augmented. The lift on the up-turned wing is lessened and on the downwardly turned wing increased, the combined result of which tends to right the plane laterally. To this end a plurality of passageways in each elongated wing tip is particularly advantageous.

Where the positive dihedral angle mounting of the airfoils is employed, such as herein illustrated, the ends of the elongated wing tips mounted at an angle to the main supporting surface of the airfoil may extend only slightly, if at all, below the inner or root ends of the airfoil at the fuselage. This is of considerable advantage in take-off and in landing in that the ends of the elongated wing tips may be maintained well above the surface of the airport, whether land or water.

As above indicated the invention is subject to considerable variation dependent on a number of conditions as above set forth, variation in the character and number of passageways and in the mounting thereof, in the respective angles between the passageways themselves and in the angle of the passageways to the reference chord line, in the angle of the elongated wing tip of the plane of the main supporting surface of the airfoil, and in other ways, all as will be well understood by those skilled in the art.

Claim to lateral control means as hereinabove set forth in which the passageways of the wing tip are substantially at right angles to the air-stream beneath the wing tip (herein defined as "substantially chordwise") without limitation as to the position of the wing tip at an angle to the plane of the main supporting surface of the airfoil, is reserved for my copending application, Ser. No. 209,220, filed May 21, 1938, as a continuation in part hereof.

The foregoing description and the drawings hereof should, therefore, be understood as given for clearness of understanding and no undue limitations should be deduced therefrom but the appended claims should be construed as broadly as permissible in view of the prior art.

I claim:

1. An airfoil for an airplane provided with an elongated wing tip extending downwardly at an angle substantially not greater than 90° from the plane of the main supporting surface of the airfoil and embodying in the wing tip a plurality of vanes or blades forming one or more passageways extending through the wing tip from the lower surface to the upper surface thereof, said vanes or blades being formed with cooperating curved surfaces and being so constructed and arranged that the said passageways are of the turbine type, the passageways being positioned substantially chordwise of the wing tip.

2. An airfoil for an airplane comprising a main supporting surface, an aileron, a flap, and an elongated wing tip extending downwardly at an angle substantially not greater than 90° from the plane of the main supporting surface of the airfoil and embodying a plurality of vanes or blades forming one or more passageways extending through the wing tip from the lower surface to the upper surface thereof, said vanes or blades being formed with cooperating curved surfaces and being so constructed and arranged that the said passageways are of the turbine type, the passageways being positioned substantially chordwise of the wing, the elongated wing tip being so related to the main supporting surface of the airfoil as to tend to trap a portion of the air otherwise escaping laterally of the airfoil and cooperating with the aileron and/or the flap when moved downwardly to increase the lift of the airfoil, the passageways of the elongated wing tip further increasing the lift of the airfoil on the movement of pressure air therethrough.

3. An airfoil supporting structure for an airplane extending to each side of the fuselage thereof and forming a positive dihedral angle in relation thereto, said airfoil supporting surface being provided at each outer end with an elongated wing tip extending downwardly therefrom at an angle not substantially greater than 90° from the plane of the main supporting surface of the adjacent airfoil structure and embodying a plurality of vanes or blades forming a plurality of passageways extending therethrough from the lower surface to the upper surface thereof, said vanes or blades being formed with cooperating curved surfaces and being so constructed and arranged that the said passageways are of the turbine type, the passageways being positioned substantially chordwise of the wing tip, the oppositely disposed elongated wing tips cooperating to increase the lift and the lateral stability of the airfoil supporting surface on the movement of pressure air through the passageways thereof.

4. An airfoil supporting surface for an airplane comprising two airfoils mounted one on each side of the fuselage of the plane and set at a positive dihedral angle in relation thereto, each airfoil being provided at its outer end with an elongated wing tip extending downwardly therefrom at an angle not substantially greater than 90° from the plane of the main supporting surface of its respective airfoil and embodying a plurality of vanes or blades forming a plurality of passageways extending therethrough from the lower surface to the upper surface thereof, said vanes or blades being formed with cooperating curved surfaces and being so constructed and arranged that the said passageways are of the turbine type, the passageways being positioned substantially chordwise in the wing tip, the oppositely disposed elongated wing tips cooperating to increase the lift and the lateral stability of the airfoil supporting surface on the movement of pressure air through the passageways thereof.

5. An airfoil supporting surface for an airplane comprising two airfoils mounted one on each side of the fuselage of the plane and set at a positive dihedral angle in relation thereto, each airfoil being provided at its rear with an aileron and a flap, and at its outer end with an elongated wing tip extending downwardly therefrom at an angle not substantially greater than 90° from the plane of the main supporting surface of its respective airfoil and embodying a plurality of vanes or blades forming one or more passageways extending therethrough from the lower surface to the upper surface thereof, said vanes or blades being formed with cooperating curved surfaces and being so constructed and arranged that the said passageways are of the turbine type, the passageways being positioned substantially chordwise in the wing tip, the oppositely disposed elongated wing tips cooperating with their respective ailerons and/or flaps when moved downwardly to increase the lift and the lateral stability of the airfoil supporting surface on the movement of pressure air through the wing tip passageways.

WILLIAM K. ROSE.